US008904414B2

(12) United States Patent
Ku et al.

(10) Patent No.: US 8,904,414 B2
(45) Date of Patent: Dec. 2, 2014

(54) SYSTEM AND METHOD OF DELIVERING VIDEO CONTENT

(75) Inventors: Bernard Ku, Austin, TX (US); Arshad Khan, Austin, TX (US); Niral Sheth, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1412 days.

(21) Appl. No.: 11/823,276

(22) Filed: Jun. 26, 2007

(65) Prior Publication Data

US 2009/0007216 A1 Jan. 1, 2009

(51) Int. Cl.
| | |
|---|---|
| H04N 7/16 | (2011.01) |
| H04N 5/445 | (2011.01) |
| G06F 3/00 | (2006.01) |
| G06F 13/00 | (2006.01) |
| H04N 21/472 | (2011.01) |
| H04N 7/173 | (2011.01) |
| H04N 21/643 | (2011.01) |
| H04N 21/2543 | (2011.01) |
| H04N 21/61 | (2011.01) |
| H04N 21/6543 | (2011.01) |
| H04N 21/658 | (2011.01) |

(52) U.S. Cl.
CPC ..... *H04N 7/17327* (2013.01); *H04N 21/47202* (2013.01); *H04N 21/64322* (2013.01); *H04N 21/2543* (2013.01); *H04N 21/6125* (2013.01); *H04N 21/6543* (2013.01); *H04N 21/6118* (2013.01); *H04N 21/6581* (2013.01)
USPC .................................... 725/1; 725/60; 725/61

(58) Field of Classification Search
USPC ................................................ 725/1, 60–61
See application file for complete search history.

(56) References Cited

U.S. PATENT DOCUMENTS

| | | | | |
|---|---|---|---|---|
| 5,640,193 | A  * | 6/1997 | Wellner | 725/100 |
| 2005/0071882 | A1 * | 3/2005 | Rodriguez et al. | 725/95 |
| 2005/0078944 | A1 | 4/2005 | Risan et al. | |
| 2006/0095338 | A1 * | 5/2006 | Seidel | 705/26 |
| 2006/0122926 | A1 * | 6/2006 | Hsu et al. | 705/35 |
| 2006/0190966 | A1 * | 8/2006 | McKissick et al. | 725/61 |
| 2006/0200426 | A1 * | 9/2006 | Baker et al. | 705/64 |
| 2007/0016654 | A1 | 1/2007 | Bowles et al. | |
| 2007/0027755 | A1 * | 2/2007 | Lee | 705/14 |
| 2008/0066114 | A1 * | 3/2008 | Carlson et al. | 725/61 |
| 2008/0114880 | A1 * | 5/2008 | Jogand-Coulomb et al. | 709/227 |
| 2008/0134251 | A1 * | 6/2008 | Blinnikka | 725/58 |
| 2008/0255994 | A1 * | 10/2008 | Schnell et al. | 705/52 |
| 2009/0019489 | A1 * | 1/2009 | Ohlfs et al. | 725/44 |
| 2010/0010920 | A1 * | 1/2010 | Storch et al. | 705/27 |
| 2010/0175086 | A1 * | 7/2010 | Gaydou et al. | 725/39 |

* cited by examiner

Primary Examiner — Ricky Chin
(74) Attorney, Agent, or Firm — Toler Law Group, PC (57) ABSTRACT

A method of delivering video content is disclosed that includes receiving a request at a video content gifting server from a first set-top box device. The request indicates a selection to purchase video content for a second subscriber associated with a second set-top box device. The method also includes sending notification information to the second set-top box device. The notification information indicates that the video content has been purchased for the second subscriber. Further, the method includes receiving viewing preferences data at the video content gifting server from the second set-top box device. The viewing preferences data indicates a particular time that the second subscriber is to receive the video content. Additionally, the method includes sending video content download data to a particular network entity. The video content download data includes instructions to send the video content to the second set-top box device at the particular time.

27 Claims, 7 Drawing Sheets

SYSTEM AND METHOD OF DELIVERING VIDEO CONTENT

FIELD OF THE DISCLOSURE

The present disclosure is generally related to systems and methods of delivering video content.

BACKGROUND

Television viewing is part of daily life for many people. Television systems typically limit the distribution of video content to personal home entertainment. As a result, television viewers are typically limited in their opportunities to share video content with friends and family. Hence, there is a need for an improved system and method of delivering video content.

DETAILED DESCRIPTION OF THE DRAWINGS

A system to deliver video content is disclosed that includes processing logic and a memory accessible to the processing logic. The memory includes a video content control module executable by the processing logic to receive data corresponding to a video content request from a first set-top box device. The video content request indicates a video content selection entered via the first set-top box device. The memory also includes a video content gift module executable by the processing logic to identify that the selected video content is associated with a gifting option. The gifting option allows the selected video content to be purchased as a gift. Further, the video content gift module is executable by the processing logic to send video content gifting information to the first set-top box device. The video content gifting information indicates that the video content is associated with the gifting option. Additionally, the video content gift module is executable by the processing logic to receive a request from the first set-top box device to purchase the video content as a gift for a second subscriber associated with a second set-top box device.

In another embodiment, a set-top box device is disclosed that includes a processor and a memory accessible to the processor. The memory includes instructions executable by the processor to receive video content from a video content provider. The memory also includes instructions executable by the processor to receive video content gifting information from a video content gifting server. The video content gifting information relates to an option to purchase the video content for a subscriber associated with an additional set-top box device. Further, the memory includes instructions executable by the processor to send a request to the video content gifting server to purchase the video content for the subscriber associated with the additional set-top box device.

In another embodiment, a method of delivering video content is disclosed that includes receiving a request at a video content gifting server from a first set-top box device. The request indicates a selection to purchase video content for a second subscriber associated with a second set-top box device. The method also includes sending notification information from the video content gifting server to the second set-top box device. The notification information indicates that the video content has been purchased for the second subscriber by a first subscriber associated with the first set-top box device. Further, the method includes receiving viewing preferences data at the video content gifting server from the second set-top box device. The viewing preferences data indicates a time that the second subscriber is to receive the video content. Additionally, the method includes sending video content download data from the video content gifting server to a particular network entity based on the viewing preferences data. The video content download data includes instructions to send the video content to the second set-top box device at the time that the second subscriber is to receive the video content.

In another embodiment, a method of delivering video content includes receiving notification information from a video content gifting server at a set-top box device indicating that a subscriber associated with the set-top box device has received a video content gift. The method also includes receiving video content related to the video content gift at the set-top box device from a video content provider server. Further, the method includes storing the video content at a data storage device associated with the set-top box device.

In another embodiment, a computer-readable medium is disclosed having instructions to cause a processor to execute a method that includes receiving a request at a video content gifting server from a first set-top box device. The request indicates a selection to purchase video content for a second subscriber associated with a second set-top box device. The computer-readable medium also includes instructions to cause a processor to execute a method that includes sending notification information from the video content gifting server to the second set-top box device. The notification information indicates that the video content has been purchased for the second subscriber by a first subscriber associated with the first set-top box device. Further, the computer-readable medium includes instructions to cause a processor to execute a method that includes receiving viewing preferences data at the video content gifting server from the second set-top box device. The viewing preferences data indicates a time that the second subscriber is to receive the video content. Additionally, the computer-readable medium includes instructions to cause a processor to execute a method that includes sending video content download data from the video content gifting server to a particular network entity based on the viewing preferences data. The video content download data includes instructions to send the video content to the second set-top box device at the time that the second subscriber is to receive the video content.

Figure 1:
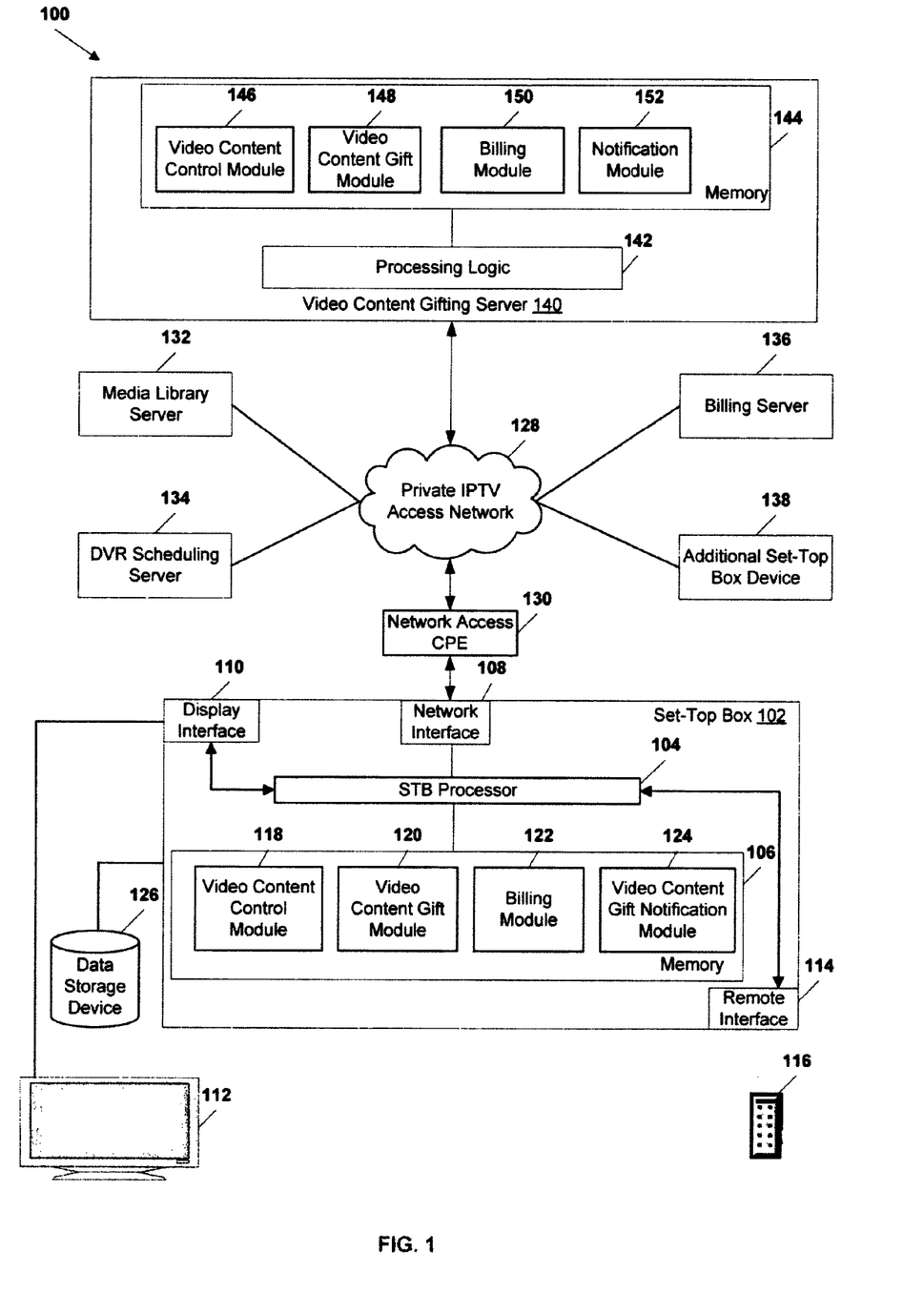
FIG. 1 is a block diagram of a particular embodiment of a system to deliver video content.

FIG. 1 is a block diagram illustrating an embodiment of a system 100 to deliver video content. The system 100 includes a set-top box device 102 that communicates with a server, such as the video content gifting server 140 via a network, such as the private Internet Protocol Television (IPTV) access network 128. The set-top box device 102 and the video content gifting server 140 may communicate with a media library server 132, a digital video recorder (DVR) scheduling server 134, a billing server 136, an additional set-top box device 138, or any combination thereof, via the IPTV access network 128.

The set-top box device 102 includes an STB processor 104 and a memory 106 accessible to the STB processor 104. The STB processor 104 can communicate video content to a display device 112 via a display interface 110. In addition, the STB processor 104 may communicate with a remote control device 116 via a remote interface 114. The set-top box device 102 may also communicate with a data storage device, such as the data storage device 126. For example, the data storage device 126 may be coupled to the set-top box device 102. In another example, the data storage device 126 may be integrated with the set-top box device 102.

In a particular embodiment, the STB processor 104 may communicate with the private IPTV access network 128 via a network interface 108. In an illustrative, non-limiting embodiment, a customer premises equipment (CPE) 130 may facilitate communication between the network interface 108 and the private IPTV access network 128. The CPE 130 may include a router, a local area network device, a modem, such as a digital subscriber line (DSL) modem, a residential gateway, any other suitable device for facilitating communication between the network interface 108 of the set-top box device 102 and the private IPTV access network 128, or any combination thereof.

In a particular embodiment, the memory 106 includes a video content control module 118 that is executable by the STB processor 104 to receive a selection of video content and to receive the selected video content from a video content provider. In an illustrative embodiment, the video content selection may be received from an input device associated with the set-top box device 102, such as the remote control device 116. The video content control module 118 can also be executable by the STB processor 104 to provide video content to the display device 112 via the display interface 110.

Additionally, the video content control module 118 may be executable by the STB processor 104 to send a request for selected video content to network devices associated with a video content provider network. In an illustrative embodiment, the set-top box device 102 may send a request for selected video content to a video server of a video content provider, such as the media library server 132, via the private IPTV access network 128. In an illustrative non-limiting embodiment, the media library server 132 may be included in a super head-end office, a regional head-end office, a national head-end office, or any combination thereof.

Figure 5:
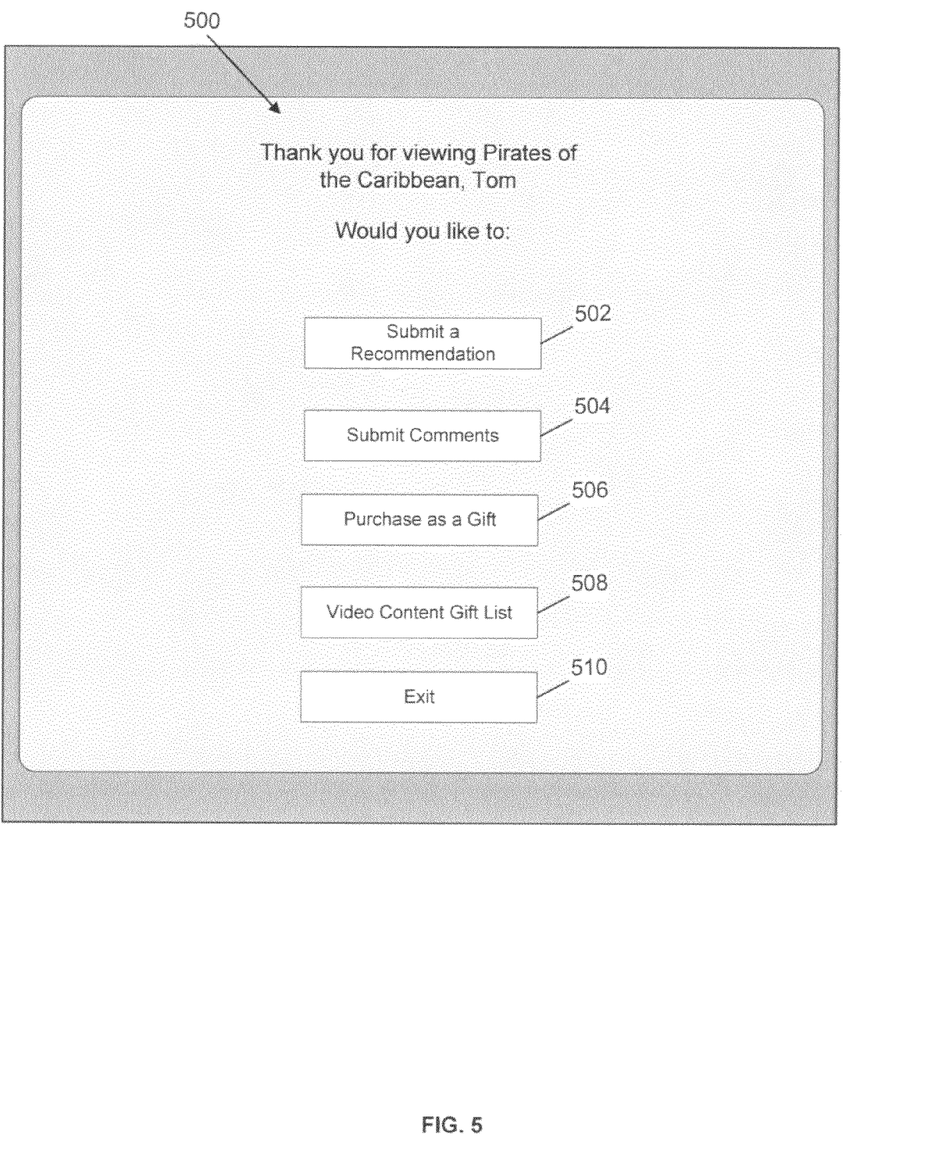
FIG. 5 is a diagram of a particular embodiment of a graphical user interface to deliver video content.

In a particular embodiment, the memory 106 may include a video content gift module 120 that is executable by the STB processor 104 to receive video content gifting information from a server, such as the video content gifting server 140. In an illustrative embodiment, the video content gifting information may include data corresponding to a graphical user interface (GUI) that can be presented at the display device 112. An example of a video content gifting GUI is illustrated in FIG. 5.

Further, the video content gift module 120 may be executable by the STB processor 104 to send a request to the video content gifting server 140 to purchase video content for a subscriber associated with another set-top box device, such as the additional set-top box device 138. In an illustrative embodiment, the video content gift may include video content that a subscriber associated with the set-top box device 102 has recently finished viewing. For example, a video content gifting GUI may be presented via the set-top box device 102 after the completion of the video content, where the video content gifting GUI includes a video content gift selection icon that is selectable to initiate a process of purchasing the video content as a gift for another subscriber.

Alternatively, the video content gift may be purchased from a list of video content gift items that are associated with a video content gifting option. The list of video content gift items may include video on-demand programming, such as movies and television programs, pay-per-view programming, such as live sporting events and live concerts, or any combination thereof. In an illustrative embodiment, the list of video content gift items may be accessed in response to an input received at the set-top box device 102. In an illustrative, non-limiting embodiment, the list of video content gift items may be accessed via a selectable icon included in the video content gifting GUI.

In an illustrative embodiment, the subscriber or subscribers designated to receive a video content gift may be selected from a list of subscribers specified by a particular subscriber associated with the set-top box device 102. For example, the list of possible video content gift recipients may be a "Buddy list" that includes friends, family, or any combination thereof, of the particular subscriber associated with the set-top box device 102. Each subscriber included in the "Buddy list" may be associated with a respective set-top box device. In another illustrative embodiment, the set-top box device 102 may be adapted to receive an identification associated with a subscriber designated to receive a video content gift. The identification may be a set-top box device number assigned by a video content provider, the name of the video content gift recipient, or any combination thereof.

In a particular embodiment, the memory 106 includes a billing module 122 that is executable by the STB processor 104 to receive an indication from the billing server 136 that an account associated with the set-top box device 102 has been charged or debited in an amount associated with the video content gift. In an illustrative, non-limiting embodiment, video content such as movies may cost less than video content associated with live sporting events. In addition, a video content provider may present incentives to purchase video content gifts, such as price discounts.

In a particular embodiment, the memory 106 includes a video content gift notification module 124 that is executable by the STB processor 104 to receive notification information from the video content gifting server 140 indicating that a subscriber associated with the set-top box device 102 has received a video content gift. In an illustrative embodiment, the notification information may include data corresponding to a pop-up window, an email message, an icon, an audio message, or any combination thereof. The set-top box device 102 may be adapted to send the notification information to the display device 112 when the set-top box device 102 is in operation. For example, the set-top box device 102 may be adapted to send the notification information to the display device 112 upon start-up of the set-top box device 102 or during a television viewing session. The set-top box device 102 may also be adapted to send the notification information to the display device 112 in response to receiving a login identification associated with the video content gift recipient at the set-top box device 102. In an illustrative, non-limiting embodiment, the notification information may include a message to the video content gift recipient from the subscriber purchasing the video content gift. For example, the message may say, "Happy Birthday," or "I hope you enjoy this program as much as I did." The message may be selected from a list of predetermined messages.

Figure 6:
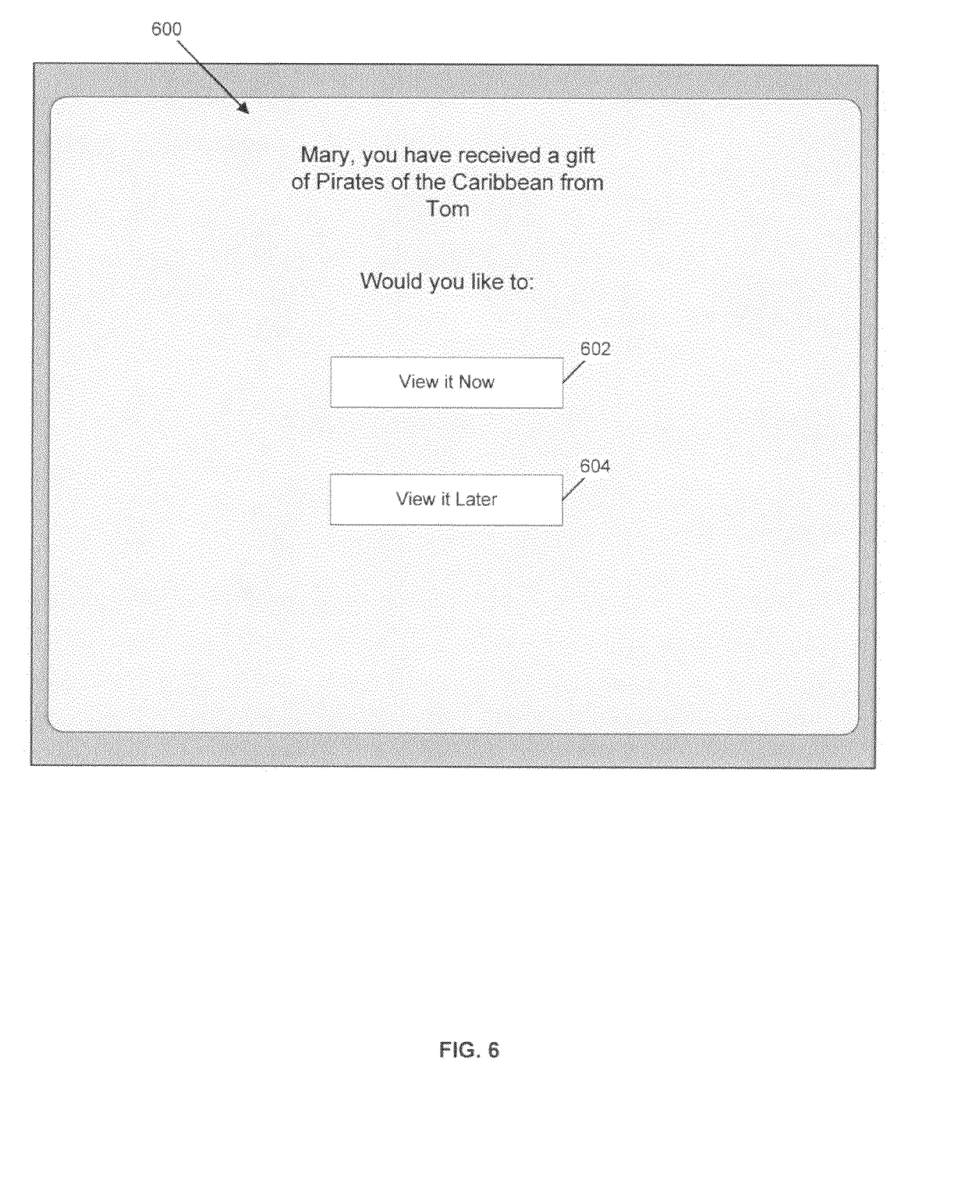
FIG. 6 is a diagram of a second particular embodiment of a graphical user interface to deliver video content.

In an illustrative embodiment, notification information may include data related to a graphical user interface (GUI) that includes a plurality of viewing preferences. For example, the plurality of viewing preferences may include a selection to view the video content at a current time, a selection to view the video content at a time specified by a video content provider, a selection to view the video content at a time specified by the video content gift recipient, or any combination thereof. An example of a viewing preferences graphical user interface (GUI) is illustrated in FIG. 6.

In a particular embodiment, the video content control module 118 is executable by the STB processor 104 to send a request to the video content gifting server 140 for the gifted video content in response to receiving a viewing preferences selection via the viewing preferences GUI. The video content control module 118 is also executable by the STB processor 104 to receive video content related to the video content gift from a video content provider according to the selected viewing preferences. For example, the set-top box device 102 may receive the video content gift at a current time or at a later time based on the selected viewing preferences. The video content control module 118 may be executable by the STB processor 104 to store the video content at a data storage device, such as the data storage device 126. In an illustrative, non-limiting embodiment, the data storage device 126 may include a digital video recorder (DVR).

The video content gifting server 140 can include processing logic 142 and a memory 144 accessible to the processing logic 142. In a particular embodiment, the memory 144 includes a video content control module 146 that is executable by the processing logic 142 to receive a video content request from a set-top box device, such as the set-top box device 102. The video content request indicates a video content selection received at the set-top box device 102. The memory 144 may also include a video content gift module 148 that is executable by the processing logic 142 to identify whether or not the video content selection is associated with a gifting option.

When the video content selection is associated with the gifting option, the video content gift module 148 is executable by the processing logic 142 to send video content gifting information to the set-top box device 102. In an illustrative embodiment, the video content gift module 148 may be executable by the processing logic 142 to send the video content gifting information to the set-top box device 102 after the end credits of certain video content, in response to receiving data at the video content gift module 148 indicating an input entered via the set-top box device 102 to stop playing the video content, in response to receiving data at the video content gift module 148 indicating a selection entered via the set-top box device 102 to view a video content gifting graphical user interface, or any combination thereof. In an illustrative, non-limiting embodiment, the video content gift module 148 may be executable by the processing logic 142 to send video content gifting information to the set-top box device 102 in response to receiving data at the video content gift module 148 indicating an input entered via the set-top box device 102 to stop playing the video content after a certain amount of the video content has been played, such as during the final scene of a movie.

In an illustrative embodiment, the video content gifting information may include data corresponding to a graphical user interface that includes a selectable option to purchase the video content as a gift. The video content gift module 148 may be executable by the processing logic 142 to receive a request from the set-top box device 102 to purchase the video content as a gift for a subscriber associated with another set-top box device, such as the additional set-top box device 138.

In a particular embodiment, the memory 144 may include a billing module 150 that is executable by the processing logic 142 to send video content purchase data to the billing server 136 indicating a selection received from the set-top box device 102 to purchase a video content gift. The billing module 150 may also be executable by the processing logic 142 to receive purchase confirmation data from the billing server 136 confirming the purchase of the video content gift by the subscriber associated with the set-top box device 102.

In a particular embodiment, the memory 144 may include a notification module 152 that is executable by the processing logic 142 to send notification information to the additional set-top box device 138 indicating that a video content gift has been purchased for a subscriber associated with the additional set-top box device 138. The notification information may include viewing preferences related to a particular time that the video content gift recipient may choose to view the video content gift. In an illustrative embodiment, the notification module 152 may be executable by the processing logic 142 to send the notification information to the additional set-top box device 138 in response to receiving the purchase confirmation data from the billing server 136.

The notification module 152 may be executable by the processing logic 142 to receive viewing preferences data from the additional set-top box device 138 in response to sending the notification information. The viewing preferences data may indicate the time that the video content gift recipient is to receive the video content gift.

In a particular embodiment, the video content control module 146 is executable by the processing logic 142 to send video content download data to a particular network entity based on the received viewing preferences data. The video content download data may include instructions to send the video content gift to the additional set-top box device 138 at the time chosen by the video content gift recipient. For example, the video content control module 146 may be executable by the processing logic 142 to send the video content download data to a video server, such as the media library server 132, if the viewing preferences data includes a selection to view the video content gift at the current time.

In another example, the video content control module 146 may be executable by the processing logic 142 to send video content download data to the digital video recorder (DVR) scheduling server 134 if the viewing preferences data includes a selection to view the video content at a later time specified by the video content gift recipient. For example, the video content gift recipient may decide to view the video content at a particular time on a particular day, such as 8 p.m. on July 1. Consequently, the DVR scheduling server 134 would send an instruction to the media library server 132 or to another video server associated with the video content provider to send the gifted video content to the additional set-top box device 138 at the designated time.

For ease of explanation, the various modules 118-124 and 146-152 have been described in terms of processor-executable instructions. However, those skilled in the art will appreciate that such modules can be implemented as hardware logic, processor-executable instructions, or any combination thereof.

Figure 2:
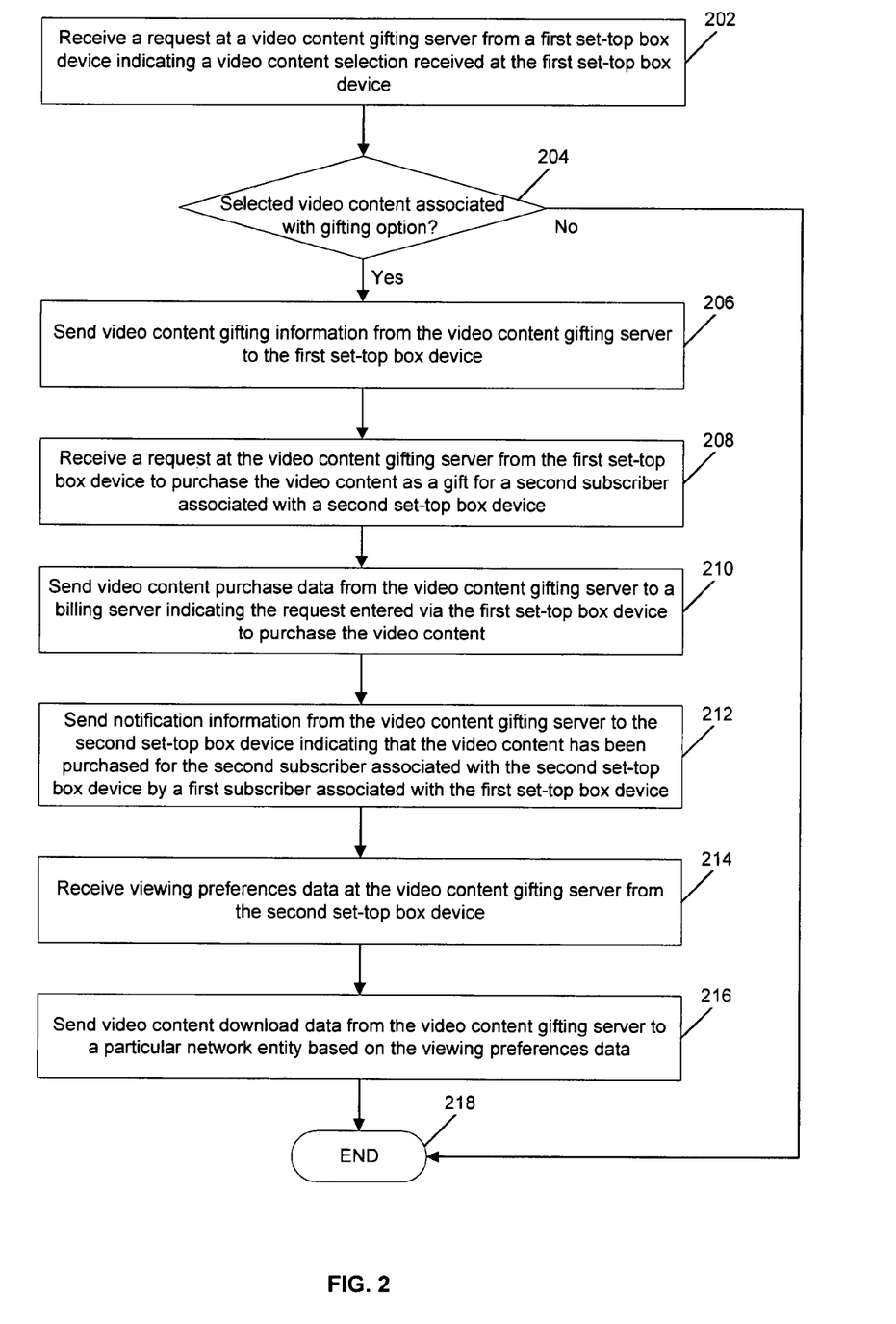
FIG. 2 is a flow diagram of a particular embodiment of a method of delivering video content.

FIG. 2 is a flow diagram of a particular embodiment of a method of delivering video content. At block 202, a video content gifting server receives a request from a first set-top box device indicating a video content selection received at the first set-top box device. Moving to decision block 204, the video content gifting server determines if the selected video content is associated with a gifting option. If the selected video content is not associated with the gifting option, then the method terminates at 218. However, if the selected video content is associated with the gifting option, the method proceeds to block 206, and the video content gifting server sends video content gifting information to the first set-top box device. The video content gifting information indicates that the video content is associated with a gifting option. For example, the video content gifting information may include data corresponding to a graphical user interface that includes a video content gift selection icon that initiates a transaction to purchase the video content as a gift.

At block 208, the video content gifting server receives a request from the first set-top box device to purchase the video content as a gift for a second subscriber associated with a second set-top box device. Moving to block 210, the video content gifting server sends video content purchase data to a billing server indicating the selection entered via the first set-top box device to purchase the video content. Proceeding to block 212, the video content gifting server sends notification information to the second set-top box device indicating that the video content has been purchased for the second subscriber associated with the second set-top box device by a first subscriber associated with the first set-top box device.

At block 214, the video content gifting server receives viewing preferences data from the second set-top box device. The viewing preferences data may indicate a time that the second subscriber associated with the second set-top box device has chosen to view the video content. Moving to block 216, the video content gifting server sends video content download data to a particular network entity based on the viewing preferences data. The video content download data may include instructions to send the video content to the second set-top box device at the particular time. For example, the video content gifting server may send the video content download data to a video server, such as a media library server, if the second subscriber associated with the second set-top box device wants to view the video content at the current time. Alternatively, the video content gifting server may send the video content download data to a DVR scheduling server to schedule a time to send the video content to the second set-top box device at a later time specified by the second subscriber associated with the second set-top box device. The method terminates at 218.

Figure 3:
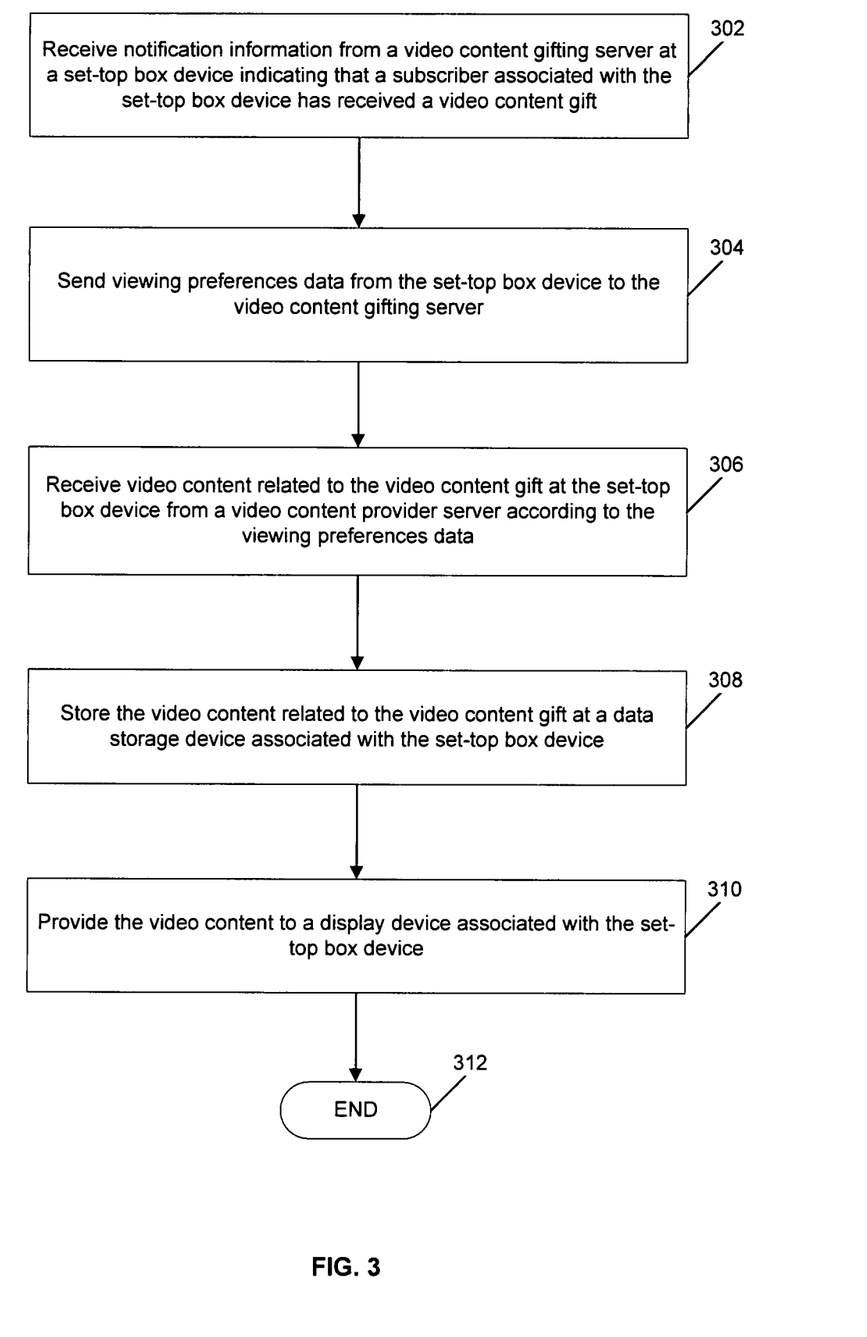
FIG. 3 is a flow diagram of a second particular embodiment of a method of delivering video content.

FIG. 3 is a flow diagram of a second particular embodiment of a method of delivering video content. At block 302, a set-top box device receives notification information from a video content gifting server indicating that a subscriber associated with the set-top box device has received a video content gift. The notification information may include data corresponding to a graphical user interface and the graphical user interface may include selectable icons relating to viewing preferences of the subscriber. Moving to block 304, viewing preferences data is sent from the set-top box device to the video content gifting server. The viewing preferences data may indicate a particular time that the subscriber associated with the set-top box device chooses to view the video content. Proceeding to block 306, the video content related to the video content gift is received at the set-top box device from a video content provider server, according to the viewing preferences data.

At block 308, in a particular embodiment, the video content related to the video content gift can be stored at a data storage device associated with the set-top box device, such as a digital video recorder (DVR). Moving to block 310, the video content is provided to a display device associated with the set-top box device. The method terminates at 312.

Figure 4:
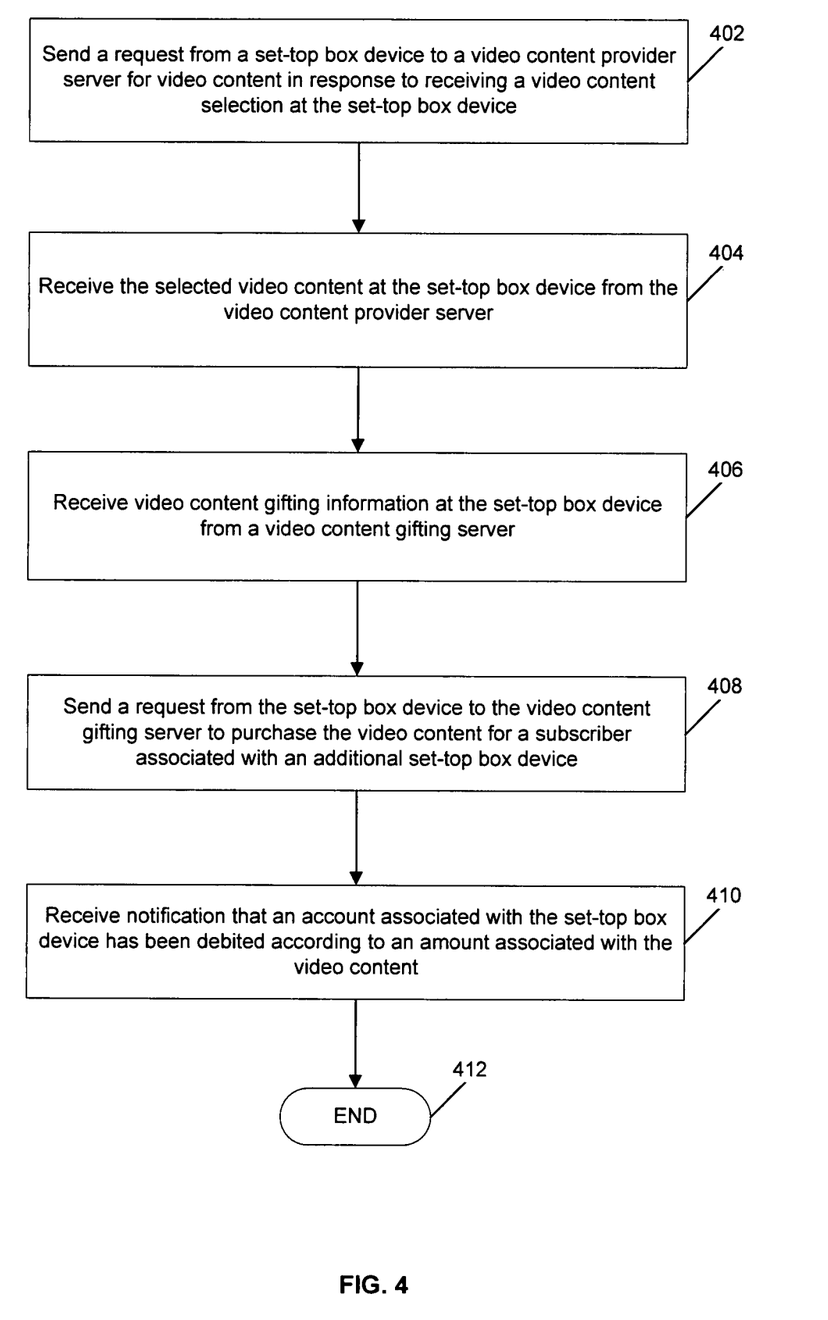
FIG. 4 is a flow diagram of a third particular embodiment of a method of delivering video content.

FIG. 4 is a flow diagram of a third particular embodiment of a method of delivering video content. At block 402, a request is sent from a set-top box device to a video content provider server for video content. The request can be sent in response to receiving a video content selection at the set-top box device. Moving to block 404, the set-top box device receives the selected video content from the video content provider server. Proceeding to block 406, the set-top box device receives video content gifting information from a video content gifting server. The video content gifting information may include a graphical user interface that provides an option to purchase the video content as a gift.

At block 408, the set-top box device sends a request to the video content gifting server to purchase the video content for a subscriber associated with an additional set-top box device. Moving to block 410, the set-top box device receives notification that an account associated with the set-top box device has been debited according to an amount associated with the video content. The method terminates at 410.

FIG. 5 is a diagram of a particular embodiment of a graphical user interface 500 to deliver video content. The graphical user interface 500 may be displayed after the completion of video content shown via the set-top box device. For example, graphical user interface 500 indicates that a subscriber associated with a particular set-top box device has finished viewing the movie Pirates of the Caribbean.

The graphical user interface 500 presents a number of selectable icons relating to options associated with the video content, such as a recommendations icon 502, a video content comment icon 504, a video content gift icon 506, a video content gift list icon 508, and an exit icon 510. The recommendations icon 502 is selectable to submit a recommendation for the video content. For example, a subscriber associated with a set-top box device may be given the option to recommend the video content to a friend or family member.

The video content comment icon 504 is selectable to submit comments relating to video content. For example, a set-top box device subscriber may want to submit positive or negative comments regarding video content to a friend or family member. The video content gift icon 506 is selectable to purchase video content that a subscriber has previously viewed as a gift for a friend or family member. The video content gift list icon 508 is selectable to present a comprehensive list of video content that may be purchased as a gift. The list of video content gift items may include video on-demand programming, such as movies and television programs, pay-per-view programming, such as upcoming live events, or any combination thereof. The exit icon 510 is selectable to allow a set-top box device subscriber to exit the graphical user interface 500 and proceed to a different graphical user interface.

FIG. 6 is a diagram of a second particular embodiment of a graphical user interface 600 to deliver video content. The graphical user interface 600 may be presented via a particular set-top box device when a subscriber associated with another set-top box device has purchased video content as a gift for the subscriber associated with the particular set-top box device. For example, graphical user interface 600 indicates that a set-top box device subscriber, Mary, has received the movie Pirates of the Caribbean as a gift from another set-top box device subscriber, Tom. The graphical user interface 600 presents options to the set-top box device subscriber, Mary, for viewing the gifted video content. Icon 602 gives Mary the option of viewing the video content at the current time. The selection of icon 602 may trigger the subsequent download of the gifted video content to a data storage device coupled to Mary's set-top box device, such as a digital video recorder (DVR). Alternatively, icon 604 gives Mary the option to view the video content at a later time. For example, the selection of icon 604 may result in another graphical user interface being presented that allows Mary to choose a particular time that she would like to watch the gifted video content, such as 8 p.m. on July 1. The gifted video content may be downloaded to a data storage device coupled Mary's set-top box device at the specified time.

Figure 7:
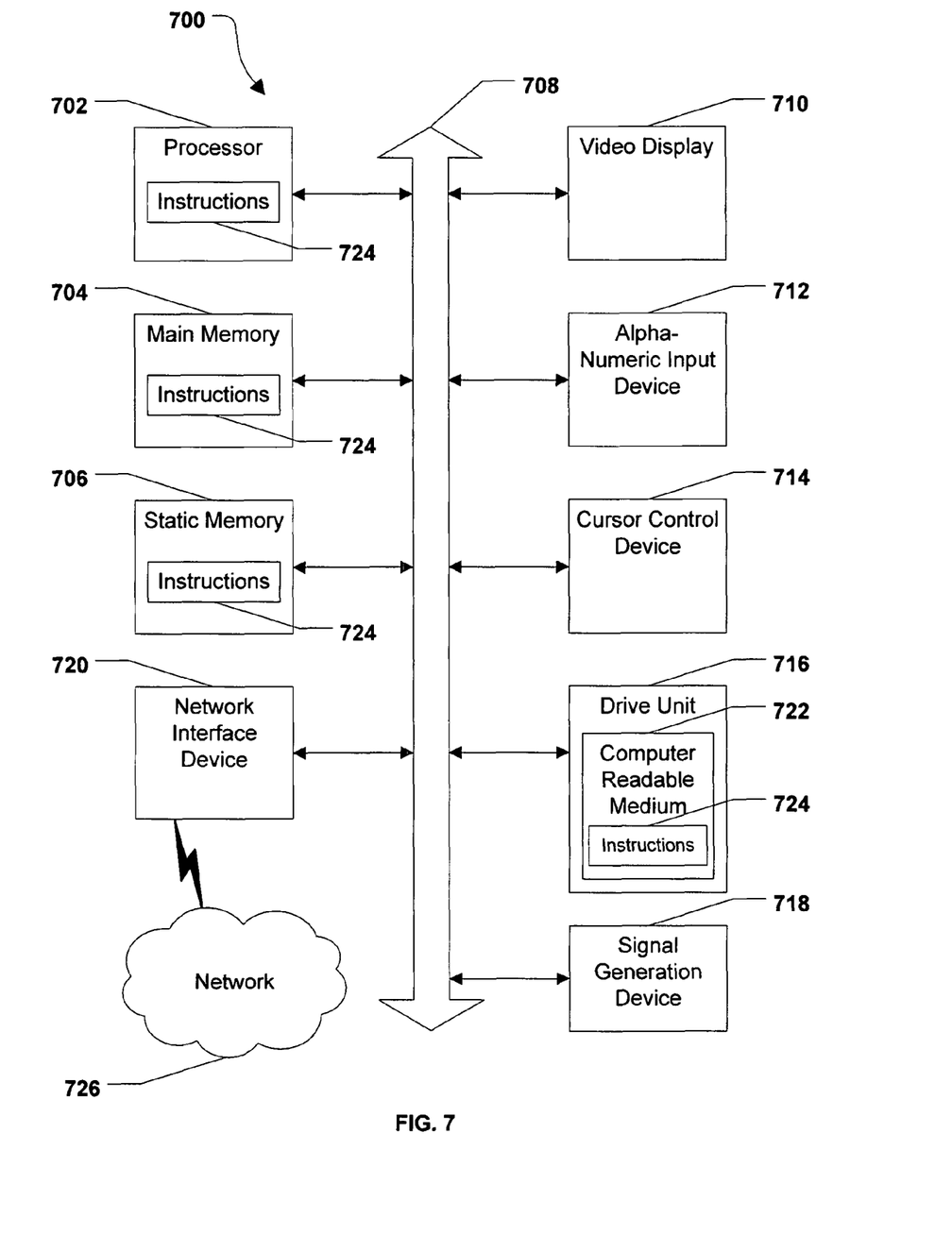
FIG. 7 is a block diagram of an illustrative embodiment of a general computer system.

Referring to FIG. 7, an illustrative embodiment of a general computer system is shown and is designated 700. The computer system 700 can include a set of instructions that can be executed to cause the computer system 700 to perform any one or more of the methods or computer based functions disclosed herein. The computer system 700, or any portion thereof, may operate as a standalone device or may be connected, e.g., using a network, to other computer systems or peripheral devices, including a video content gifting server, a media library server, a DVR scheduler server, a billing server, or set-top box device, as shown in FIG. 1.

In a networked deployment, the computer system may operate in the capacity of an IPTV server, such as a video server or application server, or a set-top box device. The computer system 700 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 700 can be implemented using electronic devices that provide voice, video or data communication. Further, while a single computer system 700 is illustrated, the term "system" shall also be taken to include any collection of systems or sub-systems that individually or jointly execute a set, or multiple sets, of instructions to perform one or more computer functions.

As illustrated in FIG. 7, the computer system 700 may include a processor 702, e.g., a central processing unit (CPU), a graphics-processing unit (GPU), or both. Moreover, the computer system 700 can include a main memory 704 and a static memory 706 that can communicate with each other via a bus 708. As shown, the computer system 700 may further include a video display unit 710, such as a liquid crystal display (LCD), an organic light emitting diode (OLED), a flat panel display, a solid state display, or a cathode ray tube (CRT). Additionally, the computer system 700 may include an input device 712, such as a keyboard, and a cursor control device 714, such as a mouse. The computer system 700 can also include a disk drive unit 716, a signal generation device 718, such as a speaker or remote control, and a network interface device 720.

In a particular embodiment, as depicted in FIG. 7, the disk drive unit 716 may include a computer-readable medium 722 in which one or more sets of instructions 724, e.g. software, can be embedded. Further, the instructions 724 may embody one or more of the methods or logic as described herein. In a particular embodiment, the instructions 724 may reside completely, or at least partially, within the main memory 704, the static memory 706, and/or within the processor 702 during execution by the computer system 700. The main memory 704 and the processor 702 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 724 or receives and executes instructions 724 responsive to a propagated signal, so that a device connected to a network 726 can communicate voice, video or data over the network 726. Further, the instructions 724 may be transmitted or received over the network 726 via the network interface device 720.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In accordance with various embodiments, the methods described herein may be implemented as one or more software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. The software may also utilize a signal containing computer instructions. A digital file attachment to e-mail or other self-contained information archive or set of archives is considered a distribution medium equivalent to a tangible storage medium. Accordingly, the disclosure is considered to include a tangible storage medium or distribution medium as listed herein, and other equivalents and successor media, in which the software implementations herein may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
receiving data at a video content gifting server, wherein the data indicates that a first set-top box device received a first request to stop playing video content;
sending, from the video content gifting server to the first set-top box device, an option to gift the video content in response to receipt of the data when an elapsed viewing time exceeds a viewing time threshold and when the video content is identified as being associated with a gifting option that allows the video content to be purchased as a gift, wherein the elapsed viewing time is a time period from a first time corresponding to selection of the video content at the first set-top box device to a second time corresponding to receipt of the first request at the first set-top box device;
receiving a second request at the video content gifting server from the first set-top box device, the second request indicating a selection to purchase the video content for a subscriber associated with a second set-top box device based on the option;
sending notification information from the video content gifting server to the second set-top box device, the notification information indicating that the video content has been purchased for the subscriber via the first set-top box device;
receiving viewing preferences data at the video content gifting server from the second set-top box device, the viewing preferences data indicating a time that the second set-top box device is to begin receiving the video content; and
sending video content download data from the video content gifting server to a media library server based on the viewing preferences data, wherein the video content download data includes instructions to the media library server to begin sending the video content to the second set-top box device at the time that the second set-top box device is to begin receiving the video content.

2. The method of claim 1, wherein the video content download data includes an instruction to send the video content immediately.

3. The method of claim 1, wherein the video content download data is sent from the video content gifting server to a digital video recorder scheduling server when the viewing preferences data includes a selection to view the video content at a particular time specified via the second set-top box.

4. The method of claim 1, further comprising sending video content purchase data from the video content gifting server to a billing server, the video content purchase data indicating the second request received from the first set-top box device to purchase the video content.

5. The method of claim 4, further comprising receiving purchase confirmation data at the video content gifting server from the billing server confirming the purchase of the video content.

6. The method of claim 5, further comprising sending a video content purchase notification from the video content gifting server to the first set-top box device, the video content purchase notification indicating that the video content has been purchased for the subscriber.

7. The method of claim 1, wherein the video content comprises a movie, a television program, a pay-per-view program, or any combination thereof.

8. A system to deliver video content, the system comprising:
   processing logic; and
   a memory accessible to the processing logic, the memory including:
      a video content control module executable by the processing logic to receive first data corresponding to a video content request from a first set-top box device, wherein the video content request indicates a selection of video content entered via the first set-top box device; and
      a video content gift module executable by the processing logic to:
         identify that the selected video content is associated with a gifting option, wherein the gifting option allows the selected video content to be purchased as a gift;
         receiving second data that indicates the first set-top box device received a first request to stop playing the selected video content;
         send video content gifting information to the first set-top box device in response to receipt of the second data when an elapsed viewing time exceeds a viewing time threshold and when the selected video content is identified as being associated with the gifting option, wherein the elapsed viewing time is a time period from a first time corresponding to selection of the selected video content at the first set-top box device to a second time corresponding to the receipt of the first request at the first set-top box device; and
         receive a second request from the first set-top box device to purchase the video content as a gift for a subscriber associated with a second set-top box device.

9. The system of claim 8, wherein the video content gifting information includes data corresponding to a graphical user interface that includes a video content gift selection icon.

10. The system of claim 9, wherein the graphical user interface includes a recommendation icon, a video content comment icon, or any combination thereof.

11. The system of claim 8, wherein the video content gift module is executable by the processing logic to receive an identification of the subscriber associated with the second set-top box device submitted via the first set-top box device.

12. The system of claim 8, wherein the video content gift module is executable by the processing logic to send the video content gifting information to the first set-top box device in response to receiving data corresponding to a selection entered via the first set-top box device to view a video content gifting graphical user interface.

13. The system of claim 8, wherein the memory further includes a gift notification module executable by the processing logic to send notification of the gift to the second set-top box device.

14. A set-top box device, comprising:
   a processor; and
   a memory accessible to the processor, the memory including instructions executable by the processor to perform operations comprising:
      receiving video content from a video content provider;
      sending data to a video content gifting server that indicates a request to stop playing the video content has been received;
      receiving video content gifting information from the video content gifting server, wherein the video content gifting information is sent by the video content gifting server in response to receipt of the data when the video content is identified as being associated with a gifting option that allows the video content to be purchased as a gift and when an elapsed viewing time exceeds a viewing threshold, wherein the elapsed viewing time is a time period from a first time corresponding to selection of the video content at the set-top box device to a second time corresponding to receipt of the request to stop playing the video content, the video content gifting information relating to an option to purchase the video content for a subscriber associated with an additional set-top box device; and
      sending a request to the video content gifting server to purchase the video content for the subscriber associated with the additional set-top box device.

15. The set-top box device of claim 14, wherein the operations further comprise receiving an indication from a billing server that an account has been debited according to an amount associated with the video content.

16. The set-top box device of claim 14, wherein the operations further comprise receiving additional video content gifting information related to purchase of additional video content for the subscriber associated with the additional set-top box device.

17. The set-top box device of claim 16, wherein the additional video content gifting information includes a list of video content items available to be purchased as gifts.

18. The set-top box device of claim 17, wherein the list of video content items includes an upcoming live event.

19. The set-top box device of claim 14, wherein the subscriber associated with the additional set-top box device is selected from a list of subscribers identified in a buddy list.

20. The set-top box device of claim 19, wherein the buddy list is stored in the memory.

21. A computer-readable non-transitory storage medium, comprising operational instructions that, when executed by a processor, cause the processor to perform operations comprising:
   receiving data that indicates a first set-top box device received a first request to stop playing video content;
   sending to the first set-top box device an option to purchase the video content as a gift in response to receipt of the data when an elapsed viewing time exceeds a viewing time threshold and when the video content is identified as being associated with a gifting option that allows the video content to be purchased as a gift, wherein the elapsed viewing time is a time period from a first time corresponding to selection of the video content at the first set-top box device to a second time corresponding to receipt of the first request at the first set-top box device;
   receiving a second request from the first set-top box device, the second request indicating a selection to purchase the video content for a second subscriber associated with a second set-top box device based on the option;

sending notification information to the second set-top box device, the notification information indicating that the video content has been purchased for the second subscriber;

receiving viewing preferences data at the video content gifting server from the second set-top box device, the viewing preferences data indicating a time that the second set-top box device is to begin receiving the video content; and sending video content download data from the video content gifting server to a media library server based on the viewing preferences data, wherein the video content download data includes instructions to the media library server to begin sending the video content to the second set-top box device at the time that the second set-top box device is to begin receiving the video content.

22. The computer-readable non-transitory storage medium of claim 21, wherein the operations further comprise sending video content gift incentive information to the first set-top box device, the video content gift incentive information relating to an incentive to purchase the video content as a gift.

23. A method comprising:

receiving data at a video content gifting server, wherein the data indicates that a first set-top box device received a first request to stop playing video content;

sending, from the video content gifting server to the first set-top box device, an option to gift the video content in response to receipt of the data when an elapsed viewing time exceeds a viewing time threshold and when the video content is identified as being associated with a gifting option that allows the video content to be purchased as a gift, wherein the elapsed viewing time is a time period from a first time corresponding to selection of the video content at the first set-top box device to a second time corresponding to receipt of the first request at the first set-top box device;

receiving a second request at the video content gifting server from the first set-top box device, the second request indicating a selection to purchase the video content for a subscriber associated with a second set-top box device based on the option; and sending notification information from the video content gifting server to the second set-top box device, the notification information indicating that the video content has been purchased.

24. The method of claim 23, wherein the notification information includes a message selected from a list of messages.

25. The method of claim 24, further comprising receiving an indication of the selection of the message at the video content gifting server from the first set-top box device.

26. The method of claim 23, further comprising:

receiving viewing preferences data at the video content gifting server from the second set-top box device, the viewing preferences data indicating a time that the second set-top box device is to begin receiving the video content; and sending video content download data from the video content gifting server to one of a media library server and a scheduling server based on the time.

27. The method of claim 25, wherein the viewing preference data includes a selection to begin receiving the video content at a time specified at the second set-top box device, and wherein the first set-top box device is associated with a first subscriber and the second set-top box device is associated with a second subscriber.

* * * * *